US010820471B2

(12) United States Patent
Wu et al.

(10) Patent No.: US 10,820,471 B2
(45) Date of Patent: Nov. 3, 2020

(54) HYDRAULIC SYSTEM FOR AN AGRICULTURAL IMPLEMENT INCORPORATING AN IMPLEMENT-BASED OVERRIDE VALVE

(71) Applicant: CNH Industrial America LLC, New Holland, PA (US)

(72) Inventors: Duqiang Wu, Bolingbrook, IL (US); John C. Endsley, Washington, IL (US); Michael Glennon, Normal, IL (US); Kevin D. McKee, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 335 days.

(21) Appl. No.: 16/111,620

(22) Filed: Aug. 24, 2018

(65) Prior Publication Data
US 2020/0060064 A1   Feb. 27, 2020

(51) Int. Cl.
| | |
|---|---|
| *A01B 63/10* | (2006.01) |
| *A01B 63/32* | (2006.01) |
| *A01B 63/22* | (2006.01) |
| *F15B 13/10* | (2006.01) |
| *F15B 20/00* | (2006.01) |
| *A01B 63/00* | (2006.01) |

(Continued)

(52) U.S. Cl.
CPC ............ *A01B 63/32* (2013.01); *A01B 63/008* (2013.01); *A01B 63/22* (2013.01); *F15B 13/10* (2013.01);

(Continued)

(58) Field of Classification Search
CPC ....... A01B 63/008; A01B 63/10; A01B 63/22; A01B 63/32

(Continued)

(56) References Cited

U.S. PATENT DOCUMENTS

| | | |
|---|---|---|
| 5,190,111 A | 3/1993 | Young et al. |
| 5,957,218 A | 9/1999 | Noonan et al. |
| (Continued) | | |

FOREIGN PATENT DOCUMENTS

| | | |
|---|---|---|
| EP | 1672225 A2 | 6/2006 |
| EP | 2696080 A1 | 2/2014 |
| WO | WO 9533136 A1 | 12/1995 |

OTHER PUBLICATIONS

Case iH Troubleshooting Support Information, EHR Override, AFS Troubleshooting, Case Agriculture, Why don't I have a work state arrow? on p. 5, Jun. 11, 2018, 41 pages total. https://www.caseih.com/northamerica/en-us/owners/afs-support/afs-troubleshooting.

(Continued)

*Primary Examiner* — Gary S Hartmann
(74) *Attorney, Agent, or Firm* — Rebecca L. Henkel; Rickard K. DeMille

(57) ABSTRACT

A hydraulic system including a supply line, an implement-based control valve, an override valve supported by the implement, and a bypass line. The control valve is fluidly coupled to the supply line and configured to regulate a flow of pressurized hydraulic fluid supplied through a downstream actuator line to a hydraulic actuator of the implement. The override valve is fluidly coupled to the actuator line downstream of the control valve and includes a supply position at which the flow of pressurized hydraulic fluid from the control valve passes through the override valve to the hydraulic actuator. The override valve is actuatable to at least one override position at which the flow of pressurized hydraulic fluid from the control valve is cut-off. The bypass line is fluidly coupled between the supply line and the override valve such that a portion of the pressurized hydraulic fluid flows to the hydraulic actuator.

20 Claims, 2 Drawing Sheets

(51) Int. Cl.
    *A01B 3/24*     (2006.01)
    *A01B 5/04*     (2006.01)
    *A01B 49/02*     (2006.01)

(52) U.S. Cl.
    CPC ............... *F15B 20/00* (2013.01); *A01B 3/24* (2013.01); *A01B 5/04* (2013.01); *A01B 49/027* (2013.01); *F15B 2211/895* (2013.01)

(58) Field of Classification Search
    USPC ........................................................ 172/315
    See application file for complete search history.

(56) References Cited

U.S. PATENT DOCUMENTS

| | | |
|---|---|---|
| 6,058,342 A | 5/2000 | Orbach et al. |
| 6,112,839 A | 9/2000 | Ostler et al. |
| 6,129,157 A * | 10/2000 | Noonan ................. A01B 63/10 172/239 |
| 9,038,289 B2 * | 5/2015 | Kelly ..................... E02F 9/2029 37/412 |
| 9,801,331 B2 | 10/2017 | Foster et al. |
| 10,299,423 B2 * | 5/2019 | Sudbrink ............... A01B 73/02 |
| 10,645,857 B2 * | 5/2020 | Glennon ................. F15B 11/08 |
| 2016/0205862 A1 | 7/2016 | Sudbrink et al. |
| 2017/0010619 A1 | 1/2017 | Foster et al. |
| 2017/0357400 A1 | 12/2017 | Foster et al. |

OTHER PUBLICATIONS

Kovacev et. al., Impact of Electronic-Hydraulic Hitch Control on Rational Exploitation of Tractor in Ploughing, Semantic Scholar, May 10, 2008, pp. 287-294. https://pdfs.semanticscholar.org/86a3/3d32df7a5f0666cfd0805e8f44038fbb98e.pdf.

* cited by examiner

HYDRAULIC SYSTEM FOR AN AGRICULTURAL IMPLEMENT INCORPORATING AN IMPLEMENT-BASED OVERRIDE VALVE

FIELD

The present subject matter relates generally to hydraulic systems for agricultural implements and, more particularly, to a hydraulic system for an agricultural implement that utilizes an implement-based override valve to allow an operator to override automatic control of the system.

BACKGROUND OF THE INVENTION

Certain agricultural implements include ground engaging tools configured to interact with the soil. For example, a tillage implement may include tillage points and/or disc blades configured to break up the soil for subsequent planting or seeding operations. Tillage implements typically include one or more actuators (e.g., hydraulic cylinders) configured to control a penetration depth of the ground engaging tools into the soil. The actuator(s) may also move the ground engaging tools between a lowered/ground engaging position and a raised/transport portion (e.g., to facilitate a repositioning the tillage implement between successive rows). The actuator(s) are typically controlled by an electronic control system having one or more electronically operated valves configured to control fluid flow (e.g., hydraulic fluid flow) to the actuator(s) in an automatic control mode.

Unfortunately, failures of the automatic control mode are possible. For example, the automatic control mode may place the ground engaging tools at an undesirable penetration depth, such as too great of a penetration depth or too shallow of a penetration depth. Operators of such agricultural implements may find it desirable to raise or lower the ground engaging tools to a fixed height to control the penetrations depth of the ground engaging tools. In other situations, a total failure of the automatic control mode may occur such that the electronic control system is not capable of moving the ground engaging tools between the lowered and raised positions. In such an instance, an operator of the agricultural implement may still need to set a certain height of the ground engaging tools to continue use of the agricultural implement or may desire to fully raise the ground engaging tools to facilitate transport of the agricultural implement (e.g., for repair or storage).

Accordingly, a hydraulic system for an agricultural implement that provides implement-based override control of the flow of hydraulic fluid supplied to one or more of the implement's actuators to address one or more of the issues identified above would be welcomed in the art.

SUMMARY OF THE INVENTION

Aspects and advantages will be set forth in part in the following description, or may be obvious from the description, or may be learned through practice of the invention.

In one aspect, the present subject matter is directed to a hydraulic system with override control for regulating the pressure of hydraulic fluid supplied to actuators of an agricultural implement. The hydraulic system includes a supply line configured to receive pressurized hydraulic fluid from a fluid source, an implement-based control valve, an override valve, and a bypass line. The implement-based control valve is fluidly coupled to the supply line and is configured to regulate a flow of the pressurized hydraulic fluid received from the supply line that is supplied through a downstream actuator line to at least one hydraulic actuator of the implement. The override valve is supported by the implement and fluidly coupled to the actuator line downstream of the control valve. The override valve includes a supply position at which the flow of pressurized hydraulic fluid from the control valve passes through the override valve to the hydraulic actuator(s). Further, the override valve is actuatable from the supply position to at least one override position at which the flow of pressurized hydraulic fluid from the control valve is cut-off. Additionally, the bypass line is fluidly coupled between the supply line and the override valve such that a portion of the pressurized hydraulic fluid from the supply line flows through the bypass line to the override valve and bypasses the control valve. As such, when the override valve is actuated to the override position(s), the portion of the pressurized hydraulic fluid flowing through the bypass line passes through the override valve to the hydraulic actuator(s).

In another aspect, the present subject matter is directed to an agricultural implement including a frame, a plurality of ground engaging tools supported by the frame, a hydraulic actuator supported by the frame, a supply line configured to receive pressurized hydraulic fluid from a fluid source, a control valve fluidly coupled to the supply line, an override valve fluidly coupled to the actuator line downstream of the control valve, and a bypass line. The hydraulic actuator is supported by the frame and is configured to raise and lower at least one of the ground engaging tools relative to a soil surface. The control valve is configured to regulate a flow of the pressurized hydraulic fluid received from the supply line that is supplied through a downstream actuator line fluidly coupled to the hydraulic actuator. The override valve includes a supply position at which the flow of pressurized hydraulic fluid from the control valve passes through the override valve to the hydraulic actuator. Further, the override valve is actuatable from the supply position to at least one override position at which the flow of pressurized hydraulic fluid from the control valve is cut-off. The bypass line is fluidly coupled between the supply line and the override valve such that a portion of the pressurized hydraulic fluid from the supply line flows through the bypass line to the override valve and bypasses the control valve. As such, when the override valve is actuated to the override position(s), the portion of the pressurized hydraulic fluid flowing through the bypass line passes through the override valve to the hydraulic actuator.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
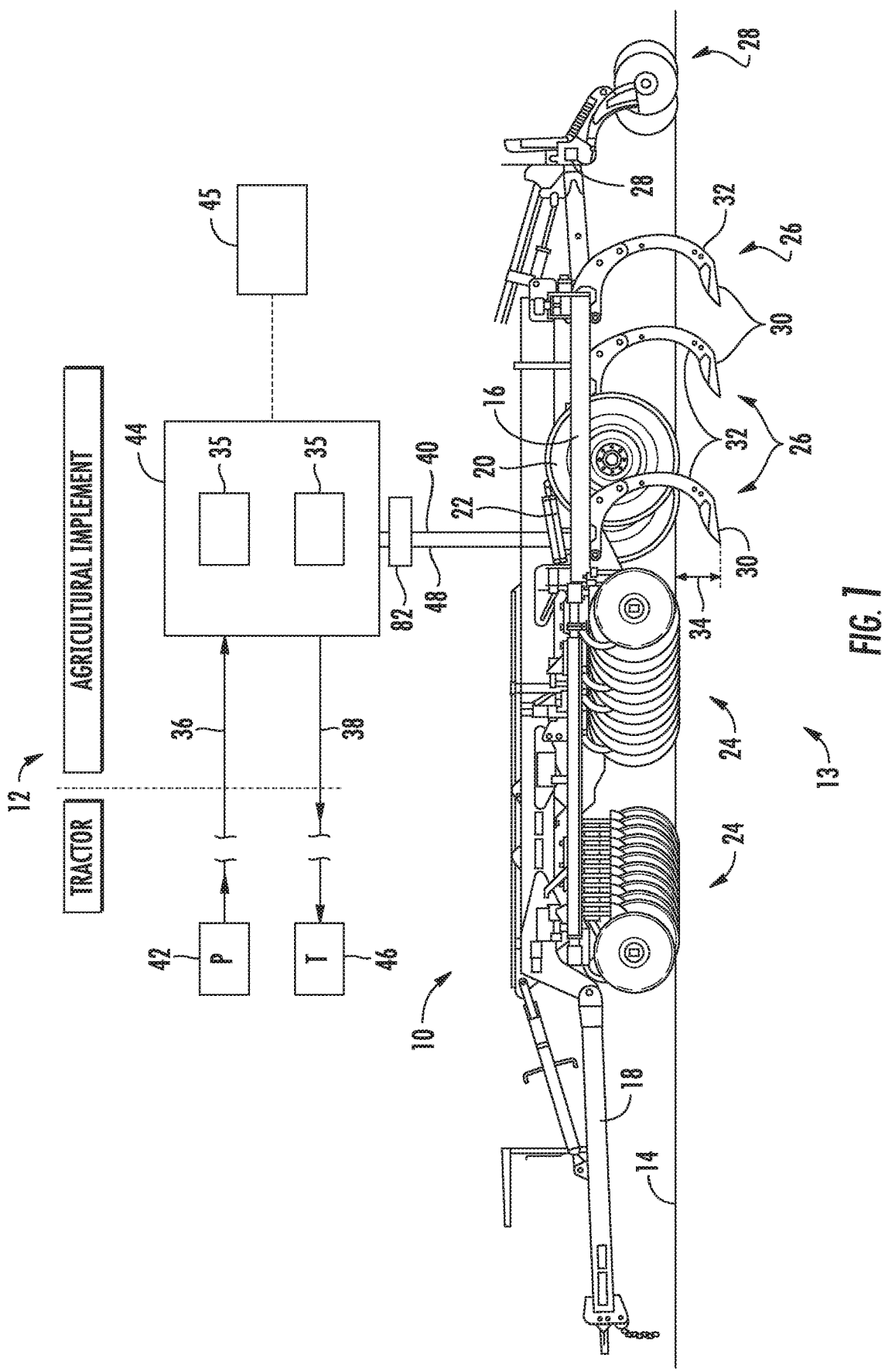
FIG. 1 illustrates a side view of one embodiment of an agricultural implement having a hydraulic system in accordance with aspects of the present subject matter.

Repeat use of reference characters in the present specification and drawings is intended to represent the same or analogous features or elements of the present invention.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to hydraulic systems for agricultural implements that incorporate implement-based override control. Specifically, in several embodiments, a supply line provides pressurized hydraulic fluid from a fluid source to an implement-based control valve. The control valve may regulate a flow of the pressurized hydraulic fluid to one or more hydraulic actuators of the agricultural implement via one or more actuator lines. An override valve supported by the implement may be fluidly coupled between the supply line and the actuator line(s). In such an embodiment, the override valve may include a supply position where the flow of pressurized hydraulic fluid from the control valve passes through the override valve to the hydraulic actuator(s). Specifically, when the override valve is located at its supply position, the control valve may be configured to automatically regulate the flow of the pressurized hydraulic fluid to the hydraulic actuator(s). Moreover, in several embodiments, the override valve may be actuatable (e.g., via a manually operated actuator) to one or more override positions that cut-off the supply of pressurized hydraulic fluid between the control valve and the hydraulic actuator(s) to allow the hydraulic system to be operated in a manual control mode. In the manual control mode, a bypass line may supply pressurized hydraulic fluid from the supply line to the override valve and bypass the control valve. As such, the override valve may be configured to control the supply of pressurized hydraulic fluid to the hydraulic actuator(s) in order to extend and/or retract the hydraulic actuator(s) without requiring separate control of the implement-based control valve.

Turning to the drawings, FIG. 1 illustrates a side view of one embodiment of an agricultural implement 10 having a hydraulic system 12. In the illustrated embodiment, the agricultural implement 10 may be a tillage implement having multiple ground engaging tools 13 configured to till soil 14. As illustrated, the agricultural implement 10 may include a frame 16 and a hitch assembly 18 coupled to the frame 16. The hitch assembly 18 may be configured to couple to a work vehicle (e.g., a tractor), and the work vehicle may be configured to tow the agricultural implement 10 through a field. In the illustrated embodiment, the agricultural implement 10 may include wheels 20 configured to engage the surface of the soil 14 and to support at least a portion of the agricultural implement 10.

In addition, the agricultural implement 10 may include one or more actuators (e.g., cylinder), such as hydraulic actuators 22, supported by the frame 16. The hydraulic actuator 22 may be configured to raise and lower at least one of the ground engaging tools 13 relative to a soil surface. In one particular embodiment, the hydraulic actuator 22 may be configured to raise and lower the ground engaging tools 13 relative to the soil surface by raising or lowering at least a portion of the frame 16. For instance, the hydraulic actuator 22 may be configured to move the wheels 20 from the illustrated raised position to a lowered position. While the wheels 20 are in the illustrated raised position, ground engaging tools of the agricultural implement 10 engage the soil 14. As the agricultural implement 10 is towed through the field, the ground engaging tools 13 break up the soil for subsequent planting or seeding operations. The hydraulic actuator 22 may lower the wheels 20 from the illustrated raised position to the lowered position. As a result, the ground engaging tools are disengaged from the soil 14 to facilitate transport of the agricultural implement 10 (e.g., between successive rows of the field).

In the illustrated embodiment, the ground engaging tools 13 may include disc blades 24, tillage point assemblies 26, and leveling discs 28. The disc blades 24 may be configured to engage a top layer of the soil 14. As the agricultural implement 10 is towed through the field, the disc blades 24 may be driven to rotate, thereby breaking up the top layer and sizing residue on the surface of the field. In the illustrated embodiment, the disc blades 24 are arranged in two rows. However, in alternative embodiments, the disc blades 24 may be arranged in more or fewer rows (e.g., 1, 2, 3, 4, 5, 6, or more). In addition, the angle of each row may be selected to control the interaction of the disc blades 24 with the top layer of the soil 14. The tillage point assemblies 26 may be configured to engage the soil 14 at a greater depth, thereby breaking up a lower layer of the soil 14. In the illustrated embodiment, each tillage point assembly 26 may include a tillage point 30 and a shank 32. The shank 32 may be configured to position the tillage point 30 at a target depth 34 beneath the soil surface, and the tillage point 30 may be configured to break up the soil 14. The shape of each tillage point 30, the arrangement of the tillage point assemblies 26, and the number of tillage point assemblies 26 may be selected to control tillage within the field. Furthermore, as the agricultural implement 10 is towed through the field, the leveling discs 28 are driven to rotate, thereby sizing soil clods, leveling the soil surface, smoothing the soil surface, and/or cutting residue on the soil surface.

In addition, the hydraulic system 12 may include a supply line 36 and a valve assembly 44 supported or otherwise installed on the implement 10, with the valve assembly 44 being fluidly coupled to the supply line 36. In general, the valve assembly 44 may include one or more implement-based control valves 35 configured to regulate the pressure of hydraulic fluid supplied to the corresponding hydraulic actuators 22 of the agricultural implement 10 when the hydraulic system 12 is being operated in an automatic control mode. As shown in FIG. 1, the supply line 36 may be configured to receive pressurized hydraulic fluid from a fluid source 42. In one embodiment, the fluid source 42 may include a pump P (e.g., hydraulic pump) disposed on the work vehicle. In such an embodiment, the supply line 36 may be configured to receive the pressurized hydraulic fluid from the pump P at a given source pressure. Additionally, in one embodiment, the supply line 36 may correspond to a power beyond line that is fluidly coupled to the pump P on the vehicle, either directly or via a separate vehicle-based valve assembly (e.g., an EHR valve block).

The hydraulic system 12 may also include a return line 38 configured to output fluid to a reservoir 46. For example, the reservoir 46 may include a tank T (e.g., hydraulic fluid tank) disposed on the work vehicle. The pump P may be fluidly coupled to the tank T, thereby circulating hydraulic fluid through the hydraulic system 12. In one particular embodiment, the fluid source 42 may be a fixed displacement pump P configured to provide pressurized hydraulic fluid through the supply line 36 at a constant source pressure. However, in other embodiments, the fluid source 42 may correspond to any other suitable source, such as variable displacement pump P.

In several embodiments, each implement-based control valve 35 may be configured to automatically regulate the flow of pressurized hydraulic fluid received from the supply line 36 that is supplied through one or more downstream actuator lines 40, 48 to a corresponding hydraulic actuator(s) 22 of the agricultural implement 10. For example, when the hydraulic system 12 is operated within its automatic control mode, the control valve 35 may automatically regulate the flow of pressurized hydraulic to the hydraulic actuator(s) 22. More particularly, the control valve 35 may, in several embodiments, be configured to regulate the fluid flow from the supply line 36 to cause the hydraulic actuator(s) 22 to both raise and lower the ground engaging tools 13 relative to the soil surface while the hydraulic system 12 is being operated within the automatic control mode.

As shown in FIG. 1, the hydraulic system 12 may also include an implement-based controller 45 communicatively coupled to the valve assembly 44 to allow the controller 45 to manipulate or control the operation of the associated control valve(s) 35. For instance, when operating in the automatic control mode, the controller 45 may be configured to automatically control the operation of one or more of the control valve(s) 35 to adjust the actuation/retraction of the associated hydraulic actuator(s) 22 based on, for example, a position of the ground engaging tools 13 relative to the soil surface.

Further, as illustrated in FIG. 1, the hydraulic system 12 may also include an override valve 82 supported by the agricultural implement 10 and fluidly coupled to the actuator lines 40, 48 between the control valve 35 and the hydraulic actuator 22. As will be described below, the override valve 82 may be configured to be actuated to an override position when the operator desires to manually control the retraction/ extension of the hydraulic actuator 22, thereby overriding the automatic control mode. Thereafter, when it is desired to return the system to its automatic control mode, the override valve 82 may be moved back to a supply or neutral position to allow the supply of pressurized hydraulic fluid to the hydraulic actuator 22 to be regulated via control of the operation of the associated control valve 35.

It should be appreciated that, while a single hydraulic actuator 22 may be controlled by the hydraulic system 12 in the illustrated embodiment, in other embodiments, the agricultural implement 10 may include more hydraulic actuators 22 controlled by the hydraulic system 12. For example, in certain embodiments, the position of each ground engaging tool 13 may be controlled by a respective hydraulic actuator 22, or the position of each group of ground engaging tools 13 (e.g., the disc blades 24, the tillage point assemblies 26, the leveling discs 28, etc.) may be controlled by a respective hydraulic actuator 22. In such embodiments, the hydraulic system 12 may control the hydraulic actuators 22 individually, together, or in groups. Furthermore, while the illustrated agricultural implement 10 includes disc blades 24, tillage point assemblies 26, and leveling discs 28, in other embodiments, the agricultural implement 10 may include other and/or additional ground engaging tools 13 (e.g., finishing reels configured to size clods and/or smooth the field surface, etc.). In addition, while the hydraulic system 12 described herein is used to control the position of ground engaging tools 13 of a tillage implement, in other embodiments, the hydraulic system 12 may be utilized to control the position of ground engaging tools 13 of other suitable implements (e.g., a planting implement, a seeding implement, a harvesting implement, etc.).

It should also be recognized that the agricultural implement of FIG. 1 is provided for exemplary purposes only to place the present subject matter in an exemplary field of use. Thus, one of ordinary skill in the art should readily appreciate that the present subject matter may generally be used with agricultural implements having any other suitable implement configuration. Further, in other embodiments, the agricultural implement 10 may be any other suitable implement (e.g., any suitable non-tillage implement) where at least one hydraulic actuator receives pressurized hydraulic fluid from a fluid source on the work vehicle.

Figure 2:
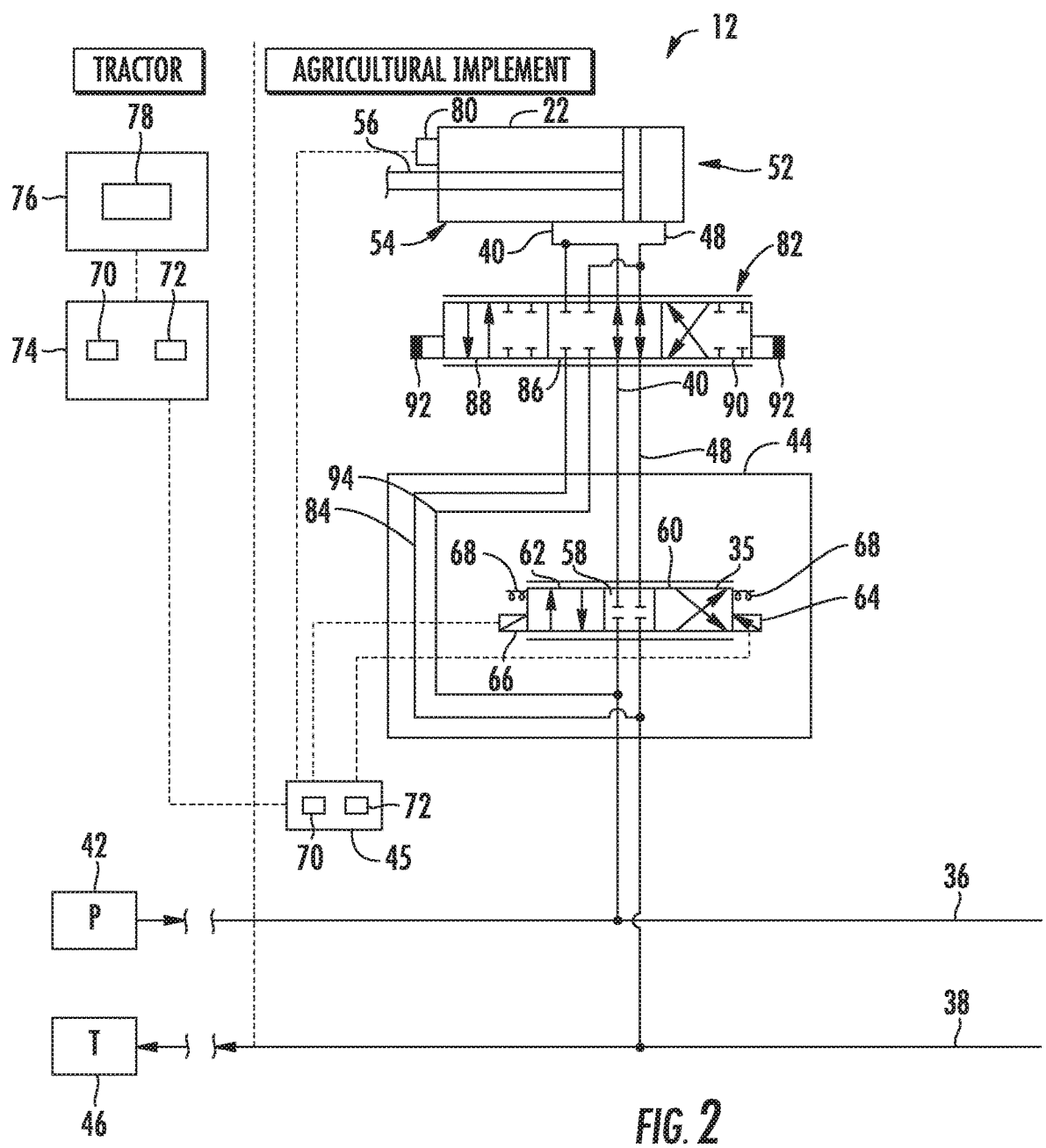
FIG. 2 illustrates a schematic diagram of one embodiment of a hydraulic system that may be employed with an agricultural implement, such as the agricultural implement of FIG. 1, in accordance with aspects of the present subject matter.

Referring now to FIG. 2, a schematic diagram of a particular embodiment of a hydraulic system that may be employed with an agricultural implement is illustrated in accordance with aspects of the present subject matter. For purposes of this description, the embodiment of the system shown in FIG. 2 will generally be described with reference to the agricultural implement 10 and the associated hydraulic system 12 of FIG. 1. However, it should be appreciated that, in other embodiments, the disclosed system may be utilized with implements having any other suitable implement configuration and/or within systems having any other suitable system configurations.

As discussed above with reference to FIG. 1, the hydraulic system 12 may include supply and return lines 36, 38 fluidly coupled to a corresponding pressure source 42 and reservoir 46, respectively (e.g., a pump P and associated fluid tank T of the work vehicle configured to tow the implement 10). Additionally, the hydraulic system 12 may include one or more control valves 35 of an implement-based valve assembly 44 configured to regulate the supply of hydraulic fluid to one or more associated hydraulic actuators 22.

As shown in the illustrated embodiment, one or more actuator lines may be provided to fluidly couple the control valve 35 to the associated hydraulic actuator 22, thereby allowing pressurized hydraulic fluid to be transferred between the control valve 35 and the actuator 22. Specifically, a first actuator line 40 may be fluidly coupled to a rod end 54 (e.g., a first end) of the hydraulic actuator 22 and a second actuator line 48 may be fluidly coupled to a cap end 52 (e.g., a second end) of the hydraulic actuator 22. Providing fluid to the cap end 52 of the hydraulic actuator 22 may drive a piston rod 56 to extend, and providing fluid to the rod end 54 of the hydraulic actuator 22 may drive the piston rod 56 to retract. In the illustrated embodiment, extension of the piston rod 56 drives the ground engaging tools 13 of the agricultural implement 10 upwardly relative to the soil surface (e.g., by driving the wheels 20 of the agricultural implement 10 downwardly relative to the frame 16), and retraction of the piston rod 56 drives the ground engaging tools 13 of the agricultural implement 10 downwardly relative to the soil surface (e.g., by driving the wheels 20 of the agricultural implement 10 upwardly relative to the frame 16). However, in other embodiments, extension of the piston rod 56 may drive the ground engaging tools 13 downwardly relative to the soil surface, and retraction of the piston rod 56 may drive the ground engaging tools 13 upwardly relative to the soil surface. In such embodiments, the second actuator line 48 may be fluidly coupled to the rod end (e.g., the first end) of the hydraulic actuator 22, and the first actuator line 40 may be coupled to the cap end (e.g., the second end) of the hydraulic actuator or vice versa. Furthermore, in certain embodiments, multiple hydraulic actuators 22 may be utilized to control the position of the ground engaging tools 13 relative to the soil surface. In such embodiments, the hydraulic actuators 22 may be fluidly coupled to one another in a series arrangement, in a parallel arrangement, in another suitable arrangement, or a combination thereof.

In the illustrated embodiment, the control valve 35 corresponds to a proportional three position/four way valve. In such an embodiment, the control valve 35 may include a neutral or first position 58 corresponding to a closed position at which fluid flow between the supply/return lines 36, 38 and the first and second actuator lines 48, 48 is blocked or cut-off. A second position 60 of the control valve 35 may be configured to facilitate fluid flow between the supply line 36 and the cap end 52 of the hydraulic actuator 22 (e.g., via the second actuator line 48) and between the return line 38 and the rod end 54 of the hydraulic actuator 22 (e.g., via the first actuator line 40) to drive the hydraulic actuator 22 to raise the ground engaging tools 13 relative to the soil surface. A third position 62 of the control valve 35 may be configured to facilitate fluid flow between the supply line 36 and the rod end 54 of the hydraulic actuator 22 and between the return line 38 and the cap end 52 of the hydraulic actuator 22 to drive the hydraulic actuator 22 to lower the ground engaging tools 13 relative to the soil surface. In the illustrated embodiment, the control valve 35 is a proportional control valve configured to control the fluid flow rate through the control valve 35 (e.g., based on the position of the valve relative to the first position 58). However, in other embodiments, the control valve 35 may be any other suitable type of valve configured to control fluid flow between the supply and return lines 36, 38 and the hydraulic actuator 22.

In the illustrated embodiment, the control valve 35 may include a raise actuator 64 configured to drive the control valve 35 to the second position 60. Further, the control valve 35 may include a lower actuator 66 configured to drive the control valve 35 to the third position 62. In the illustrated embodiment, the raise actuator 64 and the lower actuator 66 are electronically-controlled actuators (e.g., solenoid actuators) configured to move the control valve 35 in response to receiving an electric signal. In addition, the control valve 35 may include biasing elements 68 (e.g., springs) configured to urge the control valve 35 toward the first position 58. Accordingly, applying an electric current to the raise actuator 64 drives the control valve 35 to the second position 60, thereby causing the hydraulic actuator 22 to raise the ground engaging tools 13 relative to the soil surface. Furthermore, applying an electric current to the lower actuator 66 drives the control valve 35 to the third position 62, thereby causing the hydraulic actuator 22 to lower the ground engaging tools 13 relative to the soil surface. Furthermore, if no electric current is applied to either actuator 64, 66, the biasing elements 68 may drive the control valve 35 to the first position 58, thereby blocking fluid flow between the supply and return lines 36, 38 and the hydraulic actuator 22.

In the illustrated embodiment, the implement-based controller 45 may be communicatively coupled to the control valve(s) 35. Specifically, as shown in FIG. 2, the controller 45 may be communicatively coupled to the raise actuator 64 and/or to the lower actuator 66. In such an embodiment, the controller 45 may be configured to control the operation of the control valve 35 based on the position of the ground engaging tools 13 relative to the soil surface.

In certain embodiments, the controller 45 may be an electronic controller having electrical circuitry configured to process data from a source (e.g., the vehicle controller 74 as described below) and to output instructions to the control valve 35. For example, the controller 45 may communicate an electric current to the raise actuator 64 and/or the lower actuator 66. In the illustrated embodiment, the controller 45 includes a processor 70, such as a microprocessor, and a memory device 72. The controller 45 may also include one or more storage devices and/or other suitable components. The processor 70 may be used to execute software, such as software for controlling the operation of the control valve 35, and so forth. Moreover, the processor 70 may include multiple microprocessors, one or more "general-purpose" microprocessors, one or more special-purpose microprocessors, and/or one or more application specific integrated circuits (ASICS), or some combination thereof. For example, the processor 70 may include one or more reduced instruction set (RISC) processors.

The memory device 72 may include a volatile memory, such as random access memory (RAM), and/or a nonvolatile memory, such as read-only memory (ROM). The memory device 72 may store a variety of information and may be used for various purposes. For example, the memory device 72 may store processor-executable instructions (e.g., firmware or software) for the processor 70 to execute, such as instructions for controlling the control valve 35, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., threshold values, etc.), instructions (e.g., software or firmware for controlling the valve assembly 44, etc.), and any other suitable data.

In certain embodiments, the controller 45 may be communicatively coupled to a vehicle controller 74 positioned on the work vehicle. For example, the vehicle controller 74 may communicate data indicative of a desired target depth 34 (FIG. 1) and/or desired height of the ground engaging tool(s) 13. Further, in the automatic control mode, the controller 45 may receive the data indicative of, e.g., the desired target depth 34, and communicate with the control valve 35 to extend and/or retract the hydraulic actuator(s) 22 as described above. Further, it should be recognized that the vehicle controller 74 may be configured generally the same as or similar to the implement-based controller 45. For example, the vehicle controller 74 may include one or more processors 70, a memory device 72, and/or storage devices as described above with reference to the controller 45.

Still referring to FIG. 2, in the illustrated embodiment, a user interface 76 may be configured to provide input to the vehicle controller 74 and to receive output from the vehicle controller 74. As illustrated, the user interface 76 may include a display 78. The display 78 may be configured to present information to an operator, such as a numeric and/or graphical representation of the position of the ground engaging tools 13 relative to the soil surface. In certain embodiments, the display 78 may be a touch screen display configured to receive input from the operator. The user interface 76 may also include other input devices (e.g., keyboard, mouse, switches, buttons, etc.) configured to receive input from the operator.

As indicated above, the controller 45 may be configured to control the operation of the control valve(s) 35 while the hydraulic system 12 is in the automatic control mode. For example, an operator may input a target position of the ground engaging tools relative to the soil surface into the user interface 76, and the operator may engage the automatic control mode via the user interface 76. The user interface 76, in turn, may output signal(s) to the vehicle controller 74 indicative of the target position and activation of the automatic control mode. Such output signal(s) may then be communicated to the implement-based controller 45. The implement-based controller 45 may then output instructions to the control valve 35 to raise or lower the ground engaging tools based on the current position of the ground engaging tools 13 (e.g., which may be determined based on feedback from a position sensor 80) and the target position of the ground engaging tools 13. In certain embodiments, the implement-based controller 45 and/or the vehicle controller 74 may be configured to automatically determine the target position of the ground engaging tools 13 relative to the soil surface (e.g., based on the type of implement, the type(s) of ground engaging tool 13, the type of soil 14, the type of crops to be planted after tillage operations, soil conditions, etc.).

If the current position of the ground engaging tools 13 is lower than the target position, the implement-based controller 45 may instruct the control valve(s) 35 to raise the ground engaging tools 13. For example, the controller 45 may instruct the raise actuator 64 to drive the control valve(s) 35 toward the second position 60. As a result, fluid may flow from the supply line 36 to the cap end 52 of the hydraulic actuator 22, which causes the hydraulic actuator 22 to raise the ground engaging tools 13 relative to the soil surface. Because the control valve(s) 35 may be a proportional control valve in the illustrated embodiment, the controller 45 may control the fluid flow rate from the control valve(s) 35 to the cap end 52 of the hydraulic actuator 22, which may control the rate at which the hydraulic actuator 22 raises the ground engaging tools 13 relative to the soil surface.

If the current position of the ground engaging tools 13 is higher than the target position, the implement-based controller 45 may instruct the control valve(s) 35 to lower the ground engaging tools 13. For example, the controller 45 may instruct the lower actuator 66 to drive the control valve(s) 35 toward the third position 62. As a result, fluid may flow from the supply line 36 to the rod end 54 of the actuator hydraulic actuator 22, which causes the hydraulic actuator 22 to lower the ground engaging tools 13 relative to the soil surface. Because the control valve(s) 35 may be a proportional control valve, the controller 45 may control the fluid flow rate from the control valve(s) 35 to the rod end 54 of the hydraulic actuator 22, which may control the rate at which the hydraulic actuator 22 lowers the ground engaging tools relative to the soil surface.

Still referring to FIG. 2, the hydraulic system 12 may further include an override valve 82 and one or more bypass lines 84, 94 fluidly coupled to the override valve 82 that bypass the associated control valve 35. In general, the override valve 82 may be supported by or otherwise installed on the agricultural implement 10, such as by being coupled to the frame 16 of the agricultural implement 10 (as shown in FIG. 1). As shown in FIG. 2, the override valve 82 is configured to be fluidly coupled to the actuator line(s) 40, 48 downstream of the control valve 35. For instance, the override valve 82 may be fluidly coupled to the actuator line(s) 40, 48 at any suitable location between the control valve 35 and the hydraulic actuator(s) 22 to allow the override valve 82 to function as a mechanism for overriding the automatic control otherwise provided via the control valve 35.

In the illustrated embodiment, the override valve 82 corresponds to a three position, manually actuated valve. In one embodiment, the override valve 82 may include a neutral position, such as supply position 86, at which the flow of pressurized hydraulic fluid from the control valve(s) 35 passes through the override valve 82 to the hydraulic actuator(s) 22. For example, in the illustrated embodiment of FIG. 2, the supply position 86 of the override valve 82 may be configured to facilitate fluid flow from the control valve 35 through the override valve 82 to the hydraulic actuator 22 (e.g., via the actuator lines 40, 48). Further, the supply position 86 of the override valve 82 may be configured to facilitate fluid flow from the hydraulic actuator 22 back through the actuator line(s) 40, 48 for delivery to the return line 38. As such, when in the supply position 86, the override valve 82 may generally function as a pass-through valve to allow the supply of hydraulic fluid to the actuator 22 to be regulated via the control valve 35 (e.g., when the system 12 is operating within its automatic control mode). It should be recognized that, in certain embodiments, the hydraulic system 12 may include an individual override valve 82 for each control valve 35 and/or hydraulic actuator 22. In other embodiments, one override valve 82 may be provided in operative association with more than one hydraulic actuator 22 and/or control valve 35.

Additionally, in several embodiments, the override valve 82 may be actuatable from the supply position 82 to one or more override positions 88, 90 at which the flow of pressurized hydraulic fluid from the control valve(s) 35 is cut-off. For instance, the override valve 82 may be actuated to one of its override positions 88, 90 when the operator desires to cut-off the supply of hydraulic fluid to the hydraulic actuator 22 and manually control such supply of fluid via the override valve 82. However, it should also be recognized that the control valve 35, itself, may, in certain instances, be configured to cut off supply of the pressurized hydraulic fluid supplied therethrough. For instance, in situations where the controller 45 suffers a malfunction, the biasing elements 68 may drive the control valve(s) 35 to the first position 58, thereby cutting off the supply of pressurized hydraulic fluid from the control valve(s) 35. In such instances, the override valve 82 may be utilized as a back-up valve for allowing control of the retraction/extension of the hydraulic actuator 22.

In one embodiment, the override positions 88, 90 of the override valve 82 include both a first override position 88 and a second override position 90. In general, the first and second override positions 88, 90 may be configured to allow pressurized hydraulic fluid to be supplied to the hydraulic actuator 22 via the associated bypass line(s) 84, 94, thereby bypassing the control valve 35. For example, as shown in FIG. 2, the first override position 88 may be configured to facilitate a supply of pressurized hydraulic fluid between the override valve 82 and the cap end 52 of the hydraulic actuator 22. Similarly, as illustrated, the second override position 90 may be configured to facilitate a supply of pressurized hydraulic fluid between the override valve 82 and the rod end 54 of the hydraulic actuator 22. However, in other embodiments, the first override position 88 may be configured to facilitate fluid flow between the override valve 22 and the rod end 54 of the hydraulic actuator while the second override position 90 may be configured to facilitate fluid flow between the override valve 82 and the cap end 52 of the hydraulic actuator 22.

In several embodiments, the override valve 82 may be configured to be manually actuated from the neutral position to the first and second override positions 88, 90. For example, the override valve 82 may include one or more manual actuators 92 configured to allow the operator to manually actuate the override valve 82 to the supply position 86, first override position 88, and/or second override position 90. In certain embodiments, the manual actuator(s) 92 may correspond to a switch, lever, slide, and/or any other similar mechanism that allows the override valve 82 to be manually actuated between the various positions 86, 88, 90.

It should be recognized that, by actuating the override valve 82 from the supply position 86 to one of the override positions 88, 90, the operation of the hydraulic system 12 may be switched or transitioned from its automatic control mode to a manual control mode. For instance, when desired, the operator may exit the work vehicle and access the override valve 82 on the implement 10 to manually actuate the override valve 82, e.g., via the manual actuator(s) 92, to one of its override positions 88, 90, thereby allowing the automatic control mode of the hydraulic system 12 to be manually overridden.

It should also be appreciated that, although the override valve 82 is generally described herein as corresponding to a manually-actuated valve, the valve 82 may generally be configured as any suitable override valve, including any suitable electronically controlled valve. In an embodiment in which the override valve 82 corresponds to an electronically controlled valve, the operator may control the operation of the valve 82 from a remote location, such as by controlling the valve 82 via a corresponding input device located within the cab of the vehicle towing the implement 10.

As indicated above, the hydraulic system 12 also includes one or more bypass lines 84, 94 fluidly coupled to the override valve 82 that are configured to bypass the associated control valve 35. For example, as shown in FIG. 2, the system 12 includes a pressure or first bypass line 84 fluidly coupled between the supply line 36 and the override valve 82 such that a portion of the pressurized hydraulic fluid from the supply line 36 is diverted from the supply line 36 and flows through the bypass line 84 to the override valve 82, thus bypassing the control valve(s) 35. As such, when the override valve 82 is actuated to one of the override positions 88, 90, the portion of the pressurized hydraulic fluid flowing through the first bypass line 84 passes through the override valve 82 to the hydraulic actuator(s) 22. Additionally, as shown in FIG. 2, the hydraulic system 12 includes a return or second bypass line 94 fluidly coupled between the return line 38 and the override valve 82 to allow hydraulic fluid from the hydraulic actuator 22 to flow back through the override valve 82 and the second bypass line 94 to the return line 38. It should be recognized that, when the override valve 82 is located at its supply position 86, the flow of fluid through the bypass lines 84, 90 may be cut-off at the override valve 82.

In one embodiment, the first override position 88 of the override valve 82 may be associated with raising the ground engaging tool(s) 13 of the agricultural implement 10 relative to the soil surface. For example, the first override position 88 may be configured to facilitate fluid flow between the supply line 36 and the cap end 52 of the hydraulic actuator 22 (e.g., via the bypass line 84 and the second actuator line 48) and between the return line 38 and the rod end 54 of the hydraulic actuator 22 (e.g., via the actuator line 40 and the second bypass line 94) to drive the hydraulic actuator 22 to raise the ground engaging tools 13 relative to the soil surface. Similarly, the second override position 90 of the override valve 82 may be associated with lowering the ground engaging tool(s) 13 relative to the soil surface. For example, the second override position 90 may be configured to facilitate fluid flow between the supply line 36 and the rod end 54 of the hydraulic actuator 22 (e.g., via the actuator line 40 and the bypass line 84) and between the return line 38 and the cap end 52 of the hydraulic actuator 22 (e.g., via the second actuator line 48 and the second bypass line 94) to drive the hydraulic actuator 22 to lower the ground engaging tool(s) 13 relative to the soil surface. As such, it should be recognized that the override valve 82 may be used to raise and/or lower the ground engaging tools 13 to any position between and including a fully raised position and a fully lowered position.

It should be appreciated that, in one embodiment, the override valve 82 may corresponds to proportional valve configured to control the fluid flow rate through the override valve 82 (e.g., based on the position of the valve relative to the first and second override position 88, 90). However, in other embodiments, the override valve 82 may correspond to a non-proportional or fixed position valve.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hydraulic system with override control for regulating the pressure of hydraulic fluid supplied to actuators of an agricultural implement, the hydraulic system comprising:
   a supply line configured to receive pressurized hydraulic fluid from a fluid source;
   an implement-based control valve fluidly coupled to the supply line, the control valve configured to regulate a flow of the pressurized hydraulic fluid received from the supply line that is supplied through a downstream actuator line fluidly coupled to at least one hydraulic actuator of the implement;
   an override valve supported by the implement and fluidly coupled to the actuator line downstream of the control valve, the override valve including a supply position at which the flow of pressurized hydraulic fluid from the control valve passes through the override valve to the at least one hydraulic actuator, the override valve being actuatable from the supply position to at least one override position at which the flow of pressurized hydraulic fluid from the control valve is cut-off; and
   a bypass line fluidly coupled between the supply line and the override valve such that a portion of the pressurized hydraulic fluid from the supply line flows through the bypass line to the override valve and bypasses the control valve;
   wherein, when the override valve is actuated to the at least one override position, the portion of the pressurized hydraulic fluid flowing through the bypass line passes through the override valve to the at least one hydraulic actuator.

2. The hydraulic system of claim 1, wherein the supply position comprises a neutral position of the override valve and the at least one override position comprises a first override position and a second override position.

3. The hydraulic system of claim 2, wherein the override valve is configured to be manually actuated from the neutral position to the first and second override positions.

4. The hydraulic system of claim 2, wherein the first override position is associated with raising a ground engaging tool of the agricultural implement relative to a soil surface and the second override position is associated with lowering the ground engaging tool relative to the soil surface.

5. The hydraulic system of claim 1, wherein the portion of the pressurized hydraulic fluid flowing through the bypass line is cut-off at the override valve when the override valve is at the supply position.

6. The hydraulic system of claim 1, wherein the control valve is configured to automatically regulate the flow of the pressurized hydraulic fluid through the downstream actuator line to the override valve.

7. The hydraulic system of claim 6, further comprising an implement controller communicatively coupled to the control valve, the controller being configured to control the operation of the control valve when the agricultural implement is operating within an automatic control mode.

8. The hydraulic system of claim 1, wherein the agricultural implement comprises a tillage implement.

9. The hydraulic system of claim 1, wherein the supply line corresponds to a power beyond line from a vehicle configured to tow the agricultural implement.

10. An agricultural implement, comprising:
a frame;
a plurality of ground engaging tools supported by the frame;
a hydraulic actuator supported by the frame, the hydraulic actuator being configured to raise and lower at least one of the ground engaging tools relative to a soil surface;
a supply line configured to receive pressurized hydraulic fluid from a fluid source;
a control valve fluidly coupled to the supply line, the control valve configured to regulate a flow of the pressurized hydraulic fluid received from the supply line that is supplied through a downstream actuator line fluidly coupled to the hydraulic actuator;
an override valve fluidly coupled to the actuator line downstream of the control valve, the override valve including a supply position at which the flow of pressurized hydraulic fluid from the control valve passes through the override valve to the hydraulic actuator, the override valve being actuatable from the supply position to at least one override position at which the flow of pressurized hydraulic fluid from the control valve is cut-off; and
a bypass line fluidly coupled between the supply line and the override valve such that a portion of the pressurized hydraulic fluid from the supply line flows through the bypass line to the override valve and bypasses the control valve;
wherein, when the override valve is actuated to the at least one override position, the portion of the pressurized hydraulic fluid flowing through the bypass line passes through the override valve to the hydraulic actuator.

11. The agricultural implement of claim 10, wherein the supply position comprises a neutral position of the override valve and the at least one override position comprises a first override position and a second override position.

12. The agricultural implement of claim 11, wherein the override valve is configured to be manually actuated from the neutral position to the first and second override positions.

13. The agricultural implement of claim 11, wherein the first override position is associated with raising the at least one of the ground engaging tools relative to the soil surface and the second override position is associated with lowering the at least one of the ground engaging tools relative to the soil surface.

14. The agricultural implement of claim 10, wherein the portion of the pressurized hydraulic fluid flowing through the bypass line is cut-off at the override valve when the override valve is at the supply position.

15. The agricultural implement of claim 10, wherein the control valve is configured to automatically regulate the flow of the pressurized hydraulic fluid through the downstream actuator line to the override valve.

16. The agricultural implement of claim 10, further comprising an implement controller communicatively coupled to the control valve, the controller being configured to control the operation of the control valve when the agricultural implement is operating within an automatic control mode.

17. The agricultural implement of claim 10, wherein the agricultural implement comprises a tillage implement.

18. The agricultural implement of claim 10, wherein the ground engaging tools comprise at least one of disc blades, tillage point assemblies, or leveling discs.

19. The agricultural implement of claim 10, wherein the override valve comprises at least one manual actuator configured to actuate the override valve from the supply position to the at least one override position.

20. The agricultural implement of claim 19, wherein the at least one manual actuator comprises at least one of a switch, lever, or slide.

* * * * *